US006673181B1

(12) United States Patent
Berry et al.

(10) Patent No.: US 6,673,181 B1
(45) Date of Patent: Jan. 6, 2004

(54) METHOD OF MANUFACTURING FERROMAGNETIC TOROIDS USED IN FERRITE PHASE SHIFTERS

(75) Inventors: Cynthia W. Berry, Pasadena, MD (US); Deborah P. Partlow, Crownsville, MD (US); Alex E. Bailey, Hampstead, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 234 days.

(21) Appl. No.: 09/984,317

(22) Filed: Oct. 29, 2001

(51) Int. Cl.[7] .......................... B32B 31/26; B32B 31/12; B32B 31/18; H01P 1/195

(52) U.S. Cl. .................... 156/89.12; 156/182; 156/252; 156/253; 156/256; 156/257

(58) Field of Search ........................... 156/89.12, 89.16, 156/182, 252, 253, 256, 257; 333/1.1, 24.1

(56) References Cited

U.S. PATENT DOCUMENTS 5,772,820 A * 6/1998 Schoch et al. ........... 156/89.12
5,828,271 A * 10/1998 Stitzer ....................... 333/24.1
5,876,539 A 3/1999 Bailey et al.
6,162,311 A * 12/2000 Gordon et al. ........... 156/89.11

* cited by examiner

*Primary Examiner*—Curtis Mayes
(74) *Attorney, Agent, or Firm*—Birch, Stewart, Kolasch & Birch, LLP

(57) ABSTRACT

A fabrication process for ferrite toroids which utilizes ferrite ceramic tape having an improved elongation characteristic. The process utilizes a set of rigid mandrels which are employed in the final lamination to support the rectangular cross section of the internal cavity of a respective ferrite tube, thereby reducing stress concentration and permitting the highest lamination pressure to be used in the final step. The mandrels are removed prior to panel densification. The tape and mandrels operate together to minimize cracks and pores in the toroids and provide an added advantage of maintaining high tolerances in the internal cavity dimensions as well as the cavity-to-cavity alignment.

20 Claims, 3 Drawing Sheets

FIG. 4
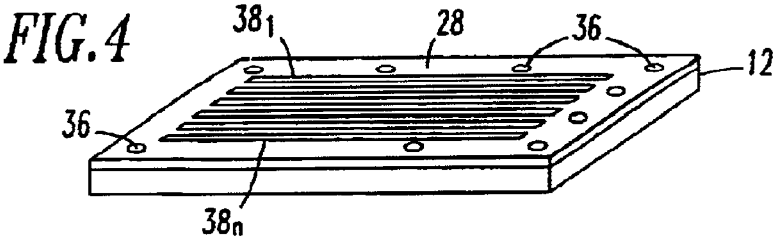
FIG. 5
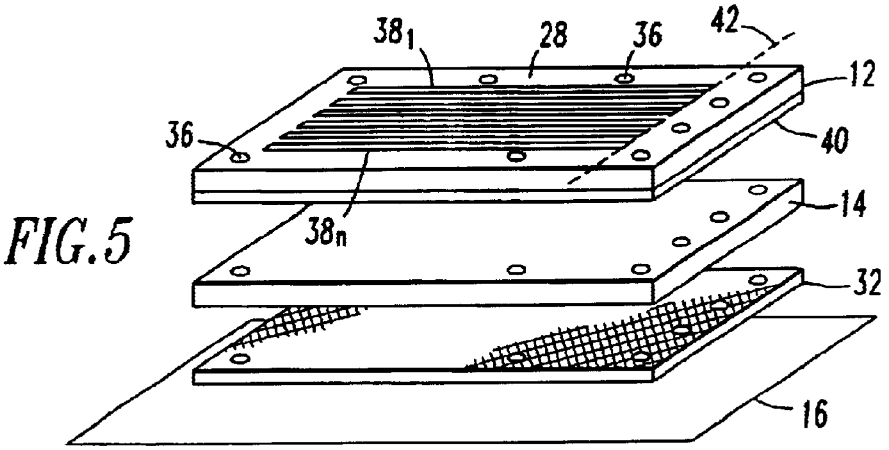
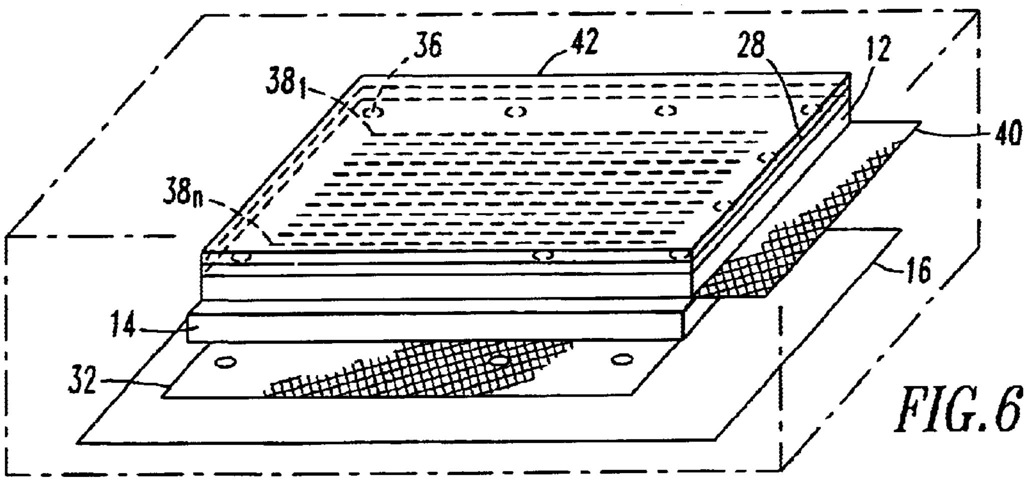
FIG. 6
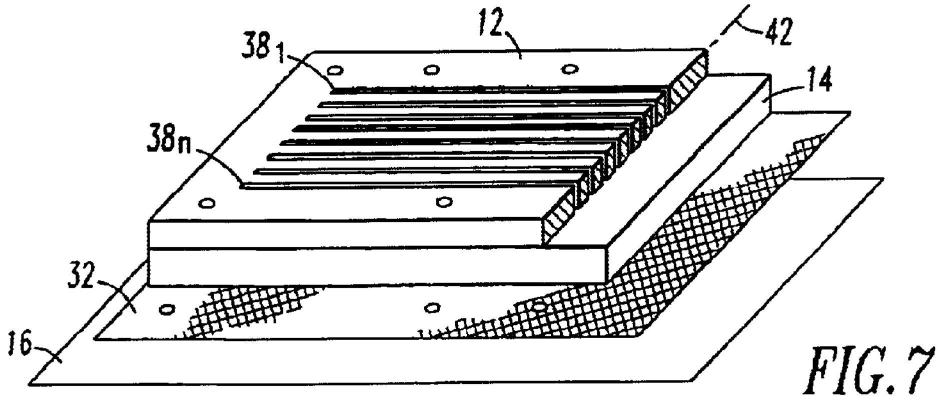
FIG. 7

METHOD OF MANUFACTURING FERROMAGNETIC TOROIDS USED IN FERRITE PHASE SHIFTERS

BACKGROUND OF THE INVENTION

1. Field of the Invention

This invention relates generally to a method of fabrication of ferrite phase shifters and more particularly to a method of fabricating ferromagnetic toroids using mandrels for controlling the toroidal shape during a lamination process of ferrite ceramic tape used to form the toroids.

2. Description of Related Art

Ferrite phase shifters are well known and comprise devices in which the phase of an electromagnetic wave at a given frequency propagating through a transmission line can be altered. Such devices have been extensively used in radar applications for electronic beam steering and phased array applications.

The most costly item in the fabrication of toroid ferrite phase shifters is the fabrication of ferromagnetic toroids where thin walled ferrite ceramic tubes having a rectangular cross section are conventionally made by pressing a ferrite powder into a mold followed by sintering a solid body and/or diffusion-bonding solid ferrite plates together. In order to maintain the dimensional tolerances required, particularly at high frequencies used for radar applications, for example, the ferrite tube still required some type of machining. For example, a Ka band toroid typically has walls of only 0.014 in. thick, with tolerances of ±0.001 in. Machining of these individual ceramic tubes, particularly the relatively weak ferrite type ceramics, is inherently expensive because of the touch labor involved which results in relatively poor yields due to breakage. Furthermore, the use of commercially available ferrite materials has led to magnetic and dielectric properties that are neither well controlled nor optimized.

One known fabrication process of which the present invention is an improvement, is shown and disclosed in U.S. Pat. No. 5,876,539 entitled "Fabrication of Ferrite Toroids", issued to Alex E. Bailey, et al. on Mar. 2, 1999. This patent is assigned to the assignee of the present invention and is specifically incorporated herein by reference.

The process shown and described in U.S. Pat. No. 5,876,539 uses a ceramic tape having a predetermined dielectric and magnetic properties which is formed in the three contiguous slabs of ferrite. The ferrite slabs are then laminated at relatively high temperatures and pressure. The center slab is routed to form longitudinal slots which later comprise square openings of a toroid. The base slab and the slotted slab are laminated at moderate pressures and finally the top slab is added. The final lamination step used to attach the top slab is done at a lower pressure than that used for any of the pre-lamination steps. It uses a lower pressure for the final lamination in order to avoid collapse of the internal, unsupported cavity formed between the slots of the center slab. Use of such lower pressures results in poor bonding of the cavity walls to the upper and lower slabs, thereby forming a transition layer that is lower in density and in some instances contains rows of pores along the laminated interface after densification/sintering is complete. Cracks formed at this interface and poor bonding of the top slab have resulted in poor reliability and yield. Moreover, inclusion of pores the toroid structure is disastrous in terms of magnetic properties of the toroid and may not perform the required phase shift. The result has been extremely high cost accompanied by moderate performance. Because of this, the assignee of the present invention has developed its own process for making toroidal phase shifters.

SUMMARY

Accordingly, it is an object of the present invention to provide an improvement in the method of fabricating ferrite toroids.

It is another object of the invention to provide improved method of fabricating ferrite toroids which improves the dimensional tolerances and therefore enhances performance of ferrite phase shifters utilizing thin walled ferrite ceramic tubes.

It is a further object of the invention to provide an improved method of fabricating relatively delicate square ferrite toroids which improves yields and therefore lowers the cost of manufacturing.

The foregoing and other objects of the invention are achieved by a fabrication process which utilizes ferrite ceramic tape having an elongation characteristic of 15–25%, and the utilization of one or more rigid mandrels which are employed in the final lamination to support the rectangular cross section of the internal cavity of a respective ferrite tube, thereby permitting the highest lamination pressure to be used in the final step, and wherein the mandrel(s) are removed prior to panel densification. These modifications work together to minimize cracks and pores in the toroids and provide an added advantage of maintaining high tolerances in the internal cavity dimensions as well as the cavity-to-cavity alignment. Such process improvements lead to increased yields and lower costs. After the final tape panel is densified, the top and bottom faces are ground and polished to provide an exact dimension on the top and bottom walls. A dual ferrite toroid can be made thereafter by aligning ferrite tube cavities and joining a pair of such toroids one on top of the other.

Further scope of applicability of the present invention will become apparent from the detailed description provided hereinafter. It should be understood, however, that the detailed description, while indicating the preferred method of the invention, is provided by way of illustration only, since various changes, alterations and modifications coming within the spirit and scope of the invention will become readily apparent to one skilled in the art.

BRIEF DESCRIPTION OF THE DRAWINGS

The present invention will become more fully understood when the detailed description of the invention provided hereinafter is considered in conjunction with the accompanying drawings, which are provided by way of illustration only and thus are not meant to be considered in a limiting sense, and wherein:

FIGS. 1–11 are perspective views illustrative of the fabrication steps utilized in accordance with the preferred method of forming ferrite toroids in accordance with the subject invention.

DETAILED DESCRIPTION OF THE INVENTION

The present invention starts with a plurality of 8.5 mil. layers of ferrite tape having a $B_r$ between 3360–3650 gauss and having an elongation characteristic of 15–25%.

Figure 1:
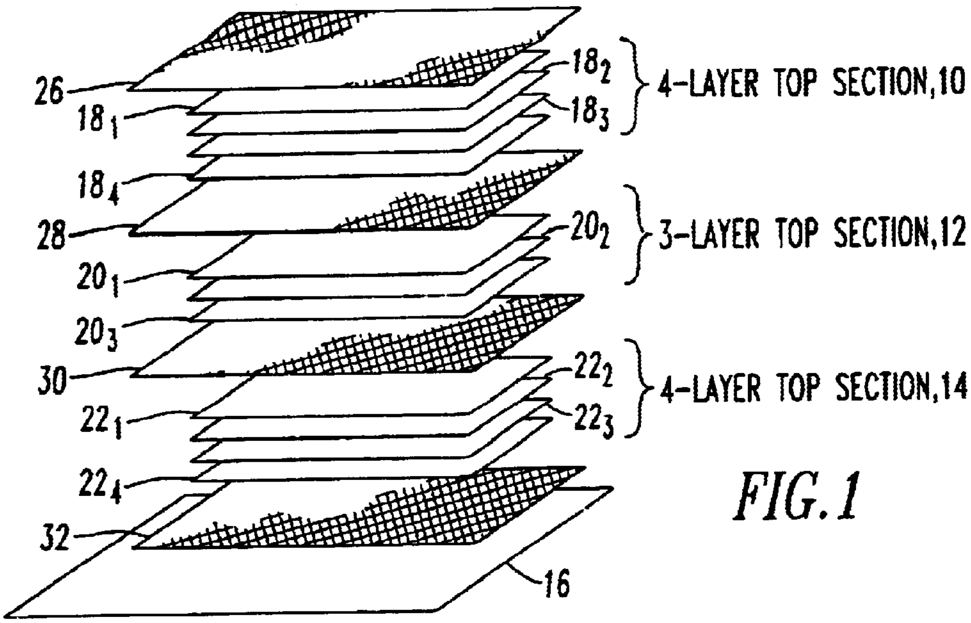

The first step in the fabrication process is shown in FIG. 1 and involves laying up three sections of ferrite tape, including a top section 10, a center section 12 and a base section 14 on a copper laminate layer 16. The top section 10 includes four ferrite tape layers $\mathbf{18}_1$, . . . $\mathbf{18}_3$, a center section 12 which includes three ferrite tape layers $\mathbf{20}_1$, $\mathbf{20}_2$, and $\mathbf{20}_3$ and the base section includes four layers of ferrite tape $\mathbf{22}_1$, . . . $\mathbf{22}_4$. Further as shown in FIG. 1, a top layer or sheet of polyester film 26 such as "Mylar" (a trademark of Dupont) is positioned atop the top section 10, an intermediate layer 28 of Mylar™ is positioned between the top and center sections 10 and 12, and a third layer 30 of Mylar™ is placed between the center and base sections 12 and 14. A bottom layer 32 of Mylar™ is located between the base section 14 and the copper laminate layer 16.

Figure 2:
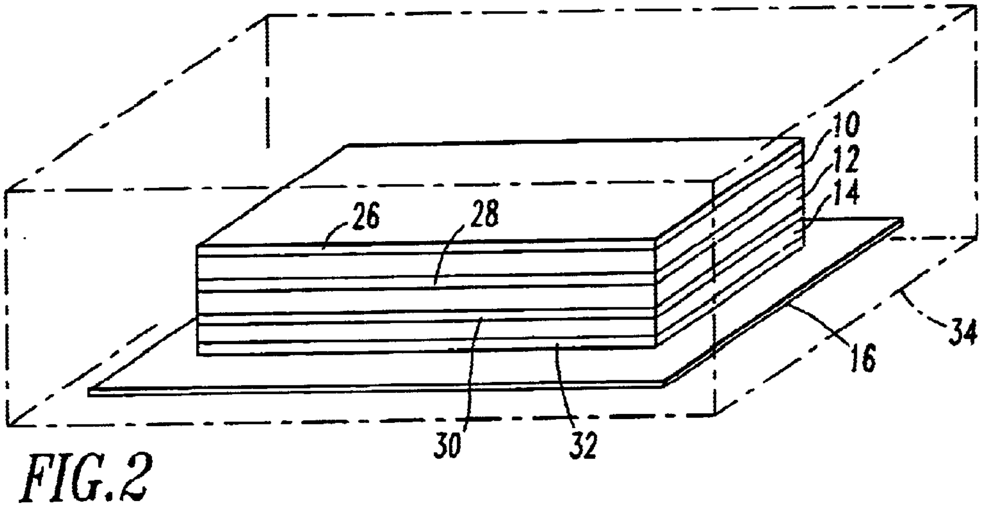
Figure 3:
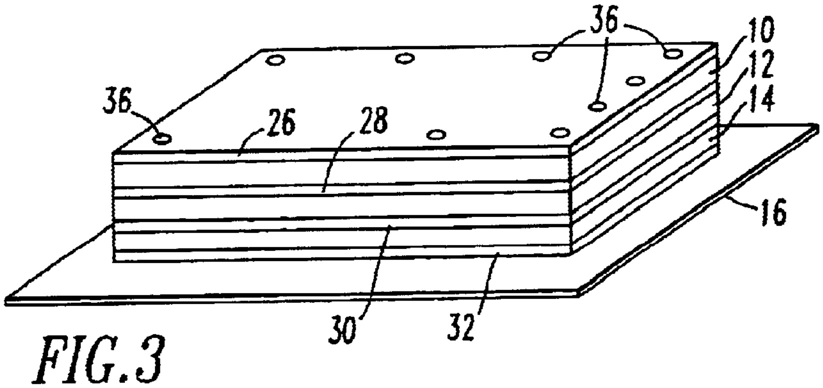

With the various component layers laid up in a stack as shown in FIG. 1, they are then isostatically laminated in a laminating fixture, such as an evacuated bladder 34 shown in FIG. 2, at a pressure of 1500 psi and temperature of 72° F. for fifteen (15) minutes.

Following this, a router device is used to simultaneously form tooling holes 36 in all three sections 10, 12, and 14, of ferrite tape 18, 20 and 22 as well as the Mylar™ layers 26, 28, 30, and 32. The Mylar™ layers 26, 28, 30, and 32 with tooling holes 36 are thus usable for later use as will be shown hereinafter.

Referring now to FIG. 4, following the first lamination step, the top and base sections 10 and 14 are removed leaving the center section 12 with the layer 28 of Mylar™ on top. This is followed by forming a plurality n of parallel elongated grooves or slots $\mathbf{38}_1$, . . . $\mathbf{38}_n$ in the center section 12 using the same router used to form the tooling holes 36. In a preferred embodiment n=27. Following the formation of the slots $\mathbf{38}_1$, . . . $\mathbf{38}_n$, the Mylar™ layer 28 including the slots formed therein is removed from the center section 12.

Following the removal of the slotted Mylar™ sheet 28, the slotted center section 12 is visually inspected and any debris in the slots is removed so that slot edges are clean and square. This is followed by a second lay-up procedure as shown in FIG. 5, where the slotted center section 12 and base section 14 are laid up on the copper laminate layer 16, with the Mylar™ sheet 32 with tooling holes 36 being in place between the base section 14 and the copper laminate 16. A new strip of Mylar™ 40 is next placed between the center and base sections 12 and 14 so that it extends inwardly past the tooling holes 36 to the proximate ends of the slots $\mathbf{38}_1$ . . . $\mathbf{38}_n$ as shown by the dotted line 42. Also, the strip of Mylar™ 40 as shown in FIG. 5 also extends out from the edges of the center and base sections 12 and 14.

Referring now to FIG. 6, the previously slotted piece of Mylar™ 28 is now placed over the slotted center section 12 along with a piece of latex 42 which is placed over the entire lay up. This is followed by a second lamination step in the evacuation bladder 34 at 1500 psi. and 7220 F. for 15 minutes.

Following the lamination step shown in FIG. 6, the assembly is removed from the bladder 34. The latex layer 42, the Mylar™ layer 28 and the underlying strip of Mylar™ 40 is then cut at the ends of the slots $\mathbf{38}_1$ . . . $\mathbf{38}_n$ along the dotted line as shown by reference numeral 42. The strips of Mylar™ 28 and 40 as well as the overlying latex sheet 42 are removed, exposing the ends of the slots $\mathbf{38}_1$ . . . $\mathbf{38}_n$, as shown in FIG. 7.

Figure 8:
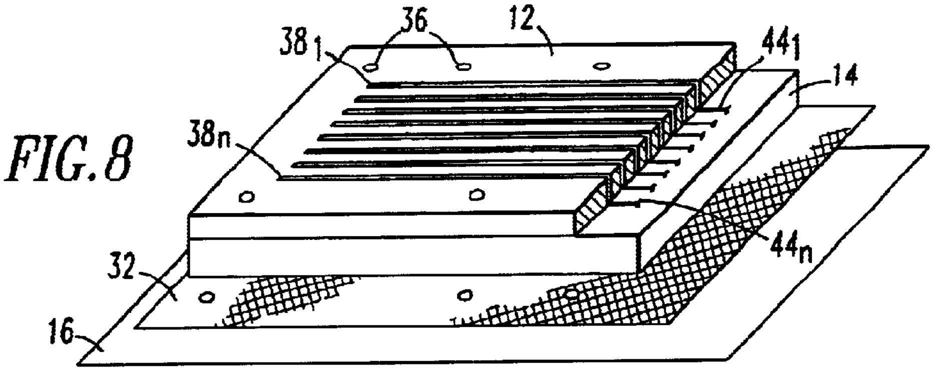

Next as shown in FIG. 8, a set of slightly rounded mandrels $\mathbf{44}_1$ . . . $\mathbf{44}_n$ for reducing stress concentration in the ferrite tape by supporting the internal cavities of the slots and being equal in number to the slots $\mathbf{38}_1$ . . . $\mathbf{38}_n$ and having a length longer than that of the slots $\mathbf{38}_1$ . . . $\mathbf{38}_n$ are coated with lecithin oil using a sponge wipe and placed in the slots $\mathbf{38}_1$ . . . $\mathbf{38}_n$. Although not shown, when desired the slotted area on top of the center section 12 can be covered with a sheet of Mylar™, not shown, so that only the slots that already contain a mandrel are exposed. Each mandrel $\mathbf{44}_i$ is slid into its respective slot $\mathbf{38}_i$ beneath the Mylar™ sheet. This will avoid smears of oil on top of the slotted center slab 12.

Once all of the mandrels $\mathbf{44}_1$ . . . $\mathbf{44}_n$ are placed in the slots $\mathbf{38}_1$ . . . $\mathbf{38}_n$, the top section 10 which was laminated in the first lamination step shown in FIG. 2 is trimmed so that it matches the current size of the slotted center section 12. The top section 10, thus trimmed, is placed over the center section 12 as shown in FIG. 9.

Figure 9:
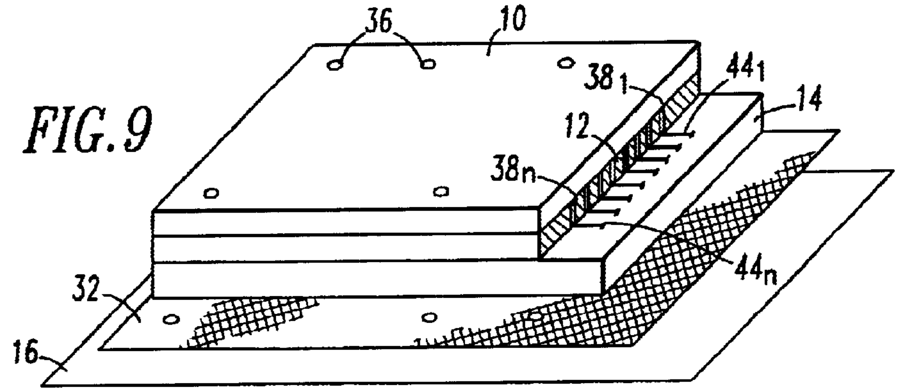
Figure 10:
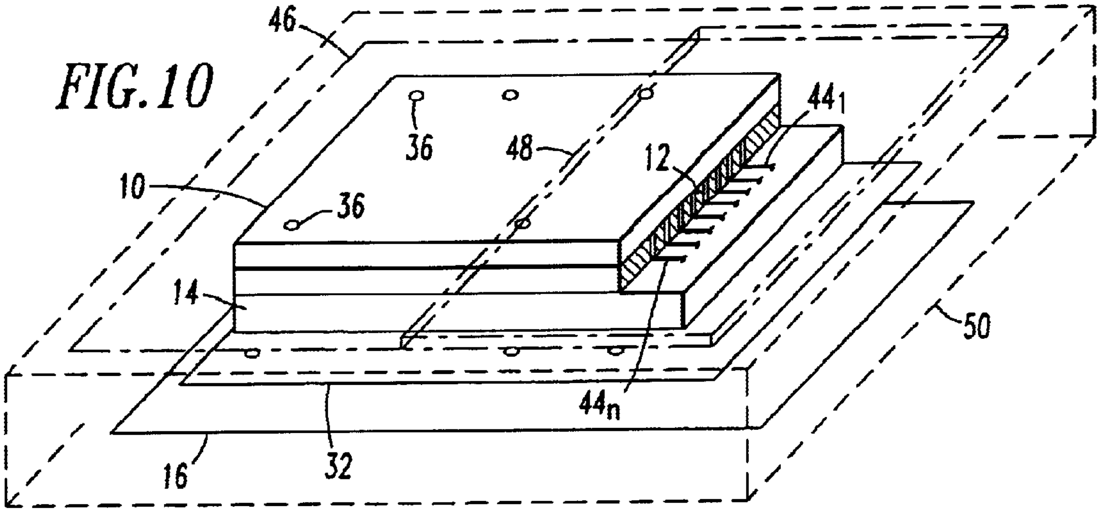

Referring now to FIG. 10, the entire assembly shown in FIG. 9 is covered with a full sheet of Mylar™ containing a set of tooling holes 36. The Mylar™ sheet 46 extends to the edges of the assembly so that all ferrite layers are covered. Next, the area where the mandrels $\mathbf{44}_1$ . . . $\mathbf{44}_n$ are covered with a strip 48 of rubber to guard against tears in a lamination bladder 50 into which the entire assembly is in place as shown in FIG. 10. A third isostatic lamination process is then effected at 72° C. at a pressure between 3000 psi and 6000 psi, e.g., 4500 psi for fifteen minutes.

Figure 11:
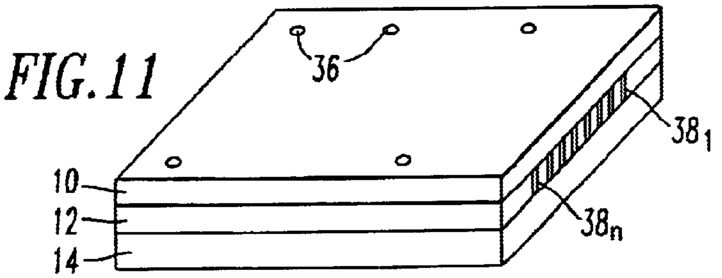

Following the third lamination step, the assembly is removed from the bladder 50 and the copper laminate layer 16 is carefully separated from the assembly as shown in FIG. 11. This is followed by cutting the base slab 14 along with the underlying Mylar™ layer 32 from beneath the mandrels $\mathbf{44}_1$ . . . $\mathbf{44}_n$. Next, the portion of the assembly remaining is clamped on a fixture, not shown, and the mandrels $\mathbf{44}_1$ . . . $\mathbf{44}_n$ are pulled out one or more at a time, typically two or three at a time.

Following removal of the mandrels $\mathbf{44}_1$ . . . $\mathbf{44}_n$, the laminated assembly is densified by firing and the top and bottom faces are ground and polished to provide an exact dimension on the top and bottom walls. This is followed by dicing into a desired slab size.

Note that the foregoing procedure is more efficient than individual machining of toroids, since numerous toroids can be ground in one operation. The size of the slab that can be used for grinding depends on the alignment of the cavities with the outside surfaces and the flatness or camber of the assembly shown, for example, in FIG. 11. Where a panel size used for grinding includes one quadrant of a 27-slot panel, such a size provides for the grinding of 27 toroids at once. Each quadrant would then be diced in half (to bisect the length of each slot) and folded over onto itself, aligning the two sets of cavities, one above the other. By gluing the required dielectric plate between these aligned cavitied structures, a dual toroid assembly is formed. Final dicing into individual dual toroids follows. Use of state-of-the art commercial dicing equipment ensures that dimensional tolerances are maintained on the diced faces.

Once the dual toroids are obtained, wire windings must be added to provide the magnetic field used to shift phase. This has traditionally been an expensive and tedious process, as it involves multiple windings of a one-mil diameter gold wire through each cavity opening. In the present invention, ceramic tape technology is used and avoids the wire winding problem by using thick film metalllization to form the windings directly in the toroid walls. Vias are used for the vertical legs and screen-printing for the horizontal legs of the windings. The windings are thus cofired with the ferrite when the panel is densified, eliminating the potential for breaking fine wires as well as the air gap between the ferrite and winding that is present when wire is wound by hand.

This intimate contact between windings and ferrite adds to the performance of the device by forcing the highest concentration of magnetic field into the ferrite. Elimination of the tedious hand winding saves further cost in the assembly process.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of forming a ferrite toroid, comprising the steps of:

(a) forming a laminated center section of a ferrite tape having a predetermined elongation characteristic;

(b) forming parallel elongated slots in the laminated center section;

(c) locating the laminated center section on top of a laminated bottom section of ferrite tape;

(d) laminating the center and bottom section in a second lamination step;

(e) cutting off an end portion of the center section and exposing the ends of the slots in the center section;

(f) placing a set of mandrels in the slots for reducing stress concentration in the ferrite tape;

(g) placing a laminated top section of ferrite tape on top of the center section with the mandrels in place;

(h) laminating the top, center and bottom section in a third lamination step to form a composite toroid structure;

(i) removing the mandrels from the slots;

(j) densifying the composite toroid structure; and (k) cutting the composite toroid structure to a selected size.

2. The method according to claim 1 wherein the predetermined elongation characteristic is at least 15%.

3. The method according to claim 1 wherein the predetermined elongation is in the range of about 15% to about 25%.

4. The method according to claim 1 wherein the ferrite tape has a $B_r$ ranging between about 3360–3650 gauss.

5. The method according to claim 1 wherein the top, center and bottom sections are formed by the steps of:

(k) initially laying up plural layers of ferrite tape on a laminate to form the top, center and bottom sections, and;

(l) locating a layer of polyester film on top of the top section;

(m) locating a layer of polyester film between the bottom section and the laminate;

(n) locating layers of polyester film between top, center and bottom sections; and (o) laminating all of the plural layers of ferrite tape of the top, center and bottom sections in a single laminating step.

6. The method according to claim 5 and additionally including the step (p) of forming matching tooling holes in the respective layers of polyester film and the laminated layers of ferrite tape of the top, center and bottom sections.

7. The method according to claim 6 wherein the step (p) of forming the matching tooling holes is performed in a single step in the respective layers of polyester film and the top, center and bottom sections.

8. The method according to claim 7 and additionally including the step (g) of separating the laminated center section from the laminated top and bottom sections prior to step (b) of forming the slots in the center section.

9. The method according to claim 8 wherein the top section includes four or more layers of ferrite tape.

10. The method according to claim 8 wherein the center section includes three or more layers of ferrite tape.

11. The method according to claim 8 wherein the bottom section includes four or more layers of ferrite tape.

12. The method according to claim 8 wherein the top section includes at least four layers of ferrite tape, the center section includes at least three layers of ferrite tape, and the bottom section includes at least four layers of ferrite tape.

13. The method according to claim 1 and additionally including the step of joining at least one pair of diced toroids so as to form a dual ferrite toroid.

14. A method of forming a ferrite toroid, comprising the steps of:

(a) laying up plural layers of ferrite tape on a laminate to form the top, center and bottom sections separated by respective layers of polyester film and including a layer of polyester film on top of the top section and a layer of polyester film between the bottom section and the laminate, said layers of ferrite tape having an elongation characteristic of between about 15% and 25%;

(b) simultaneously forming matching tooling holes in the respective layers of polyester film and the laminated layers of ferrite tape of the top, center and bottom sections;

(c) separating the laminated sections;

(d) forming parallel elongated slots in the laminated center section;

(e) locating the laminated center section on top of the laminated bottom section of ferrite tape;

(f) laminating the center and bottom section in a second lamination step;

(g) cutting off an end portion of the center section and exposing the ends of the slots in the center section;

(h) placing a set of elongated mandrels in the slots;

(i) placing the laminated top section of ferrite tape on top of the center section with the mandrels in place;

(j) laminating the top, center and bottom section in a third lamination step to form a composite toroid structure;

(k) removing the mandrels from the slots;

(1) densifying the composite toroid structure by firing; and (m) dicing the composite toroid structure into a desired slab size.

15. The method according to claim 14 and additionally including the step (n) of grinding and polishing the composite toroid structure before the dicing step (m).

16. The method according to claim 14 wherein the dicing step (m) further includes dicing the slab in half and joining the halves together to form a dual toroid assembly.

17. The method according to claim 14 wherein the top section includes four or more layers of ferrite tape.

18. The method according to claim 14 wherein the center section includes three or more layers of ferrite tape.

19. The method according to claim 14 wherein the bottom section includes four or more layers of ferrite tape.

20. The method according to claim 14 wherein the top section includes at least four layers of ferrite tape, the center section includes at least three layers of ferrite tape, and the bottom section includes at least four layers of ferrite tape.

* * * * *